Aug. 28, 1956

R. R. THALNER

SCANNING AMPLIFIER AND HIGH-VOLTAGE SUPPLY FOR CATHODE-RAY TUBES

Filed Sept. 14, 1953

2,761,090

INVENTOR
ROBERT R. THALNER
BY John A. Harvey
ATTORNEY 2,761,090
Patented Aug. 28, 1956

1

2,761,090

SCANNING AMPLIFIER AND HIGH-VOLTAGE SUPPLY FOR CATHODE-RAY TUBES

Robert R. Thalner, Buffalo, N. Y., assignor to Sylvania Electric Products Inc., a corporation of Massachusetts Application September 14, 1953, Serial No. 380,029
5 Claims. (Cl. 315—27)

Figure 1:
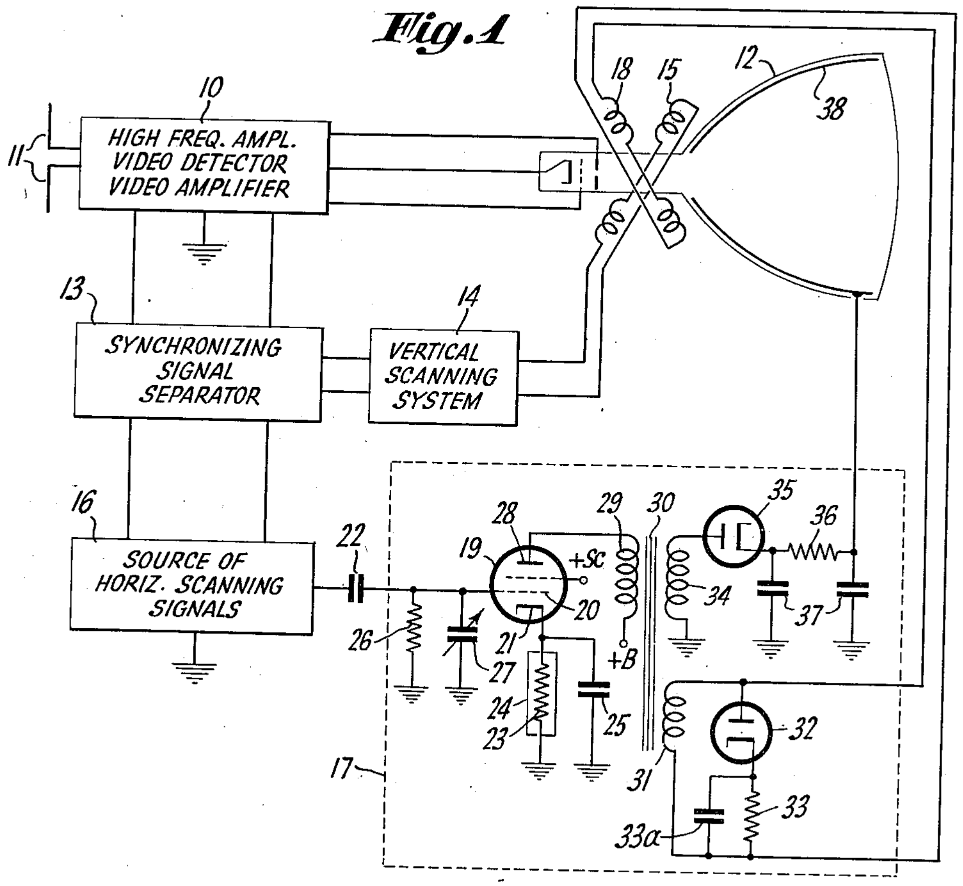

The present invention relates to a combined scanning signal amplifier and high-voltage supply for a cathode-ray tube and, particularly, to such as are particularly suitable for use in the horizontal scanning system of a television receiver.

The horizontal scanning amplifier of a conventional television receiver ordinarily supplies currents of sawtooth wave form to a horizontal deflection winding of a scanning yoke positioned about the neck of a cathode-ray tube type of image reproducing device by which to effect horizontal deflection of the electron beam of the tube. The deflection winding is ordinarily coupled to the scanning amplifier through a transformer which includes a high voltage winding used to develop, during the relatively short retrace intervals, a high-voltage potential essentially of pulse wave form. This potential is supplied to a rectifying system which derives a high uni-directional voltage which is used to energize the high-voltage anode of the image reproducing device.

For many years, television receiver manufacturers have been forced to allow a generous safety margin in the design of the horizontal deflection amplifier system in order that the amplifier tube ratings would not be exceeded at high power-supply line voltages. Such a design requirement makes it difficult, at times, to obtain the full image area scan at low line voltage even with maximum drive of the horizontal scanning system. At the same time, such variations of supply line voltage to the receiver produce variations in the high-voltage supply to the anode of the image reproducing device with resultant variations of picture size. In addition to the amplifier tube anode current variations which occur with these variations of line voltage, there may be a wide range of variation of the current going through the diode tube which is connected as a damper tube across the horizontal scanning winding of the scanning yoke. All such changes of average current flowing through the amplifier and damper tubes and changes of voltage of the high-voltage supply are undesirable not only because of the difficulty in providing an economical and trouble-free design but also because of the annoyance which the user of the receiver experiences when the picture brightness and size changes. This is especially true where the changes occur in an abrupt and erratic manner.

It is an object of the present invention, therefore, to provide a new and improved scanning signal amplifier and high-voltage supply system which avoids one or more of the disadvantages and limitations of prior such arrangements.

It is a further object of the invention to provide a novel scanning signal amplifier and high-voltage supply processing operating characteristics which are highly stabilized against variations of power-supply line voltage.

It is an additional object of the invention to provide a novel scanning signal amplifier and high-voltage supply which is not only of simple and inexpensive construction but also one which effects automatic compensation of its operating characteristics against power-supply line voltage variations.

2

Figure 2:
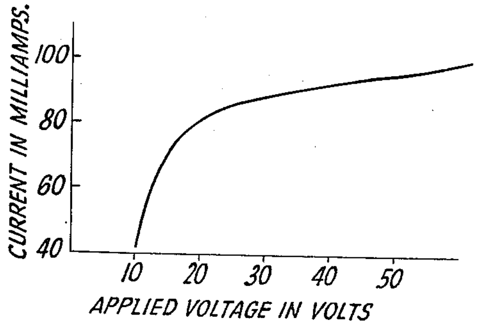

For a better understanding of the present invention, together with other and further objects thereof, reference is had to the following description taken in connection with the accompanying drawing in which:

Fig. 1 is a circuit diagram, partly schematic, of a complete television receiver embodying the present invention in a particular form; and Fig. 2 is a graph representing certain operating characteristics of an element of the Fig. 1 arrangement and is used as an aid in explaining its operation.

Referring now more particularly to Fig. 1, the television receiver there shown includes a unit 10 having an input circuit coupled to an antenna 11 and an output circuit coupled to the intensity-control electrodes of a cathode-ray tube type of image reproducer 12. Unit 10 is conventional and includes a high-frequency amplifier, a video detector, and a video amplifier. The picture signal developed in the output circuit of the video detector of unit 10 is applied to a synchronizing signal separator 13 where the synchronizing signal components of the picture signal are separated from each other and from the video components thereof, the vertical synchronizing components being supplied to control the synchronized operation of a vertical scanning system 14. The output circuit of the latter unit is coupled to a vertical deflecting winding 15 of a scanning yoke positioned in conventional manner about the neck of the image reproducer 12. The horizontal synchronizing signal components, separated from the television signal by the unit 13, are similarly applied to a source of horizontal scanning signals 16 to control the synchronized operation thereof. The unit 16 is conventional, and the output circuit of this unit is coupled to a scanning amplifier and high-voltage supply 17, the detailed arrangement and operation of which will be described hereinafter. The scan output circuit of unit 17 is coupled to a horizontal scanning winding 18 of the deflection yoke, and the high-voltage output circuit of this unit is connected to the final anode 38 of the image reproducer 12.

With the exception of the scanning amplifier and high-voltage supply 17, the construction and operation of the television receiver thus far described is conventional in that a television signal received by the antenna 11 is applied to unit 10 where it is amplified, detected, and again amplified after detection before being used to control the intensity of the cathode-ray beam of the image reproducing tube 12. The vertical and horizontal synchronizing components of the received signal are separated by the separator 13 and are applied to the respective vertical scanning system 14 and source of horizontal scanning signals 16 to control the synchronized operations thereof. The scanning signal supplied from the output circuit of the unit 14 to the vertical deflecting winding 15 and the scanning signal supplied to the horizontal scanning winding 18 through the unit 17 from the source 16 cause the cathode-ray beam of the tube 12 to trace a raster of horizontal lines to reproduce the television image.

Referring now more particularly to the portion of the receiver embodying the present invention, the unit 17 includes an amplifier tube 19 having a control electrode 20 and cathode 21 coupled through a condenser 22 to the output circuit of the unit 16. The cathode 21 is connected to ground through a nonlinear impedance 23 which has a nonlinear but positive coefficient of resistance and may be comprised by a tungsten wire conductor hermetically enclosed within a gas-filled envelope 24. A condenser 25, having a capacitance of the order of 20 microfarads, is connected in shunt to the impedance 23 and a resistor 26 is connected between the control electrode 20 of tube 19 and ground. An adjustable condenser 27 is also connected between the control electrode 20 and ground and serves by adjustment of its capacitance to vary the amplitude of the signal of scanning wave form applied from the unit 16 to the input electrodes of tube 19. The amplifier tube 19 also includes an anode 28 which is coupled through the primary winding 29 of an output transformer 30 to a source of power energization indicated as +B. It is conventional to obtain such power energization by rectification of alternating-current energy supplied from power mains which nominally have a voltage of 117 volts but in practice may vary in different localities or during different hours of the day from about 100 volts to 130 volts with corresponding variation of the +B energization. The transformer 30 includes a secondary winding 31 which is coupled to the horizontal deflecting winding 18 of the scanning yoke. Connected across the secondary winding 31 is a diode type of damper tube 32 connected in series with a resistor 33 and shunt-connected condenser 33$a$. The transformer 30 also includes a high-voltage winding 34 which is connected through a diode rectifier tube 35 and a filter network, comprising a series resistor 36 and shunt condensers 37, to the second or high-voltage anode 38 of the image reproducing device 12.

Considering now the operation of the scanning amplifier and high-voltage supply just described, and referring to the curve of Fig. 2, the scanning signal of composite saw-tooth and pulse wave form supplied from the unit 16 to the amplifier tube 19 is amplified by the latter and supplied through the transformer 30 to the scanning winding 18 of the scanning yoke, the damper tube 32 operating in conventional manner to damp out transient oscillations which tend to occur at the beginning of each trace interval. The nonlinear impedance 23 has a value of resistance which increases with increasing values of current flowing through the impedance as shown by the curve of Fig. 2 which represents the voltage developed across the impedance with respect to the current flowing through the impedance. This nonlinear characteristic has two operating effects. First, it will be noted that the impedance change flattens out above about 20 volts developed across the impedance 23. This flattened range of impedance variation tends to hold the average current of tube 19 within a much more restricted range of deviations from the nominal value of anode current than would otherwise be the case with a linear impedance where the power-supply line voltage varies from its lowest to its highest permissible value. Secondly, the control electrode 20 of the tube 19 is coupled through the resistor 26 to the ground terminal of the impedance 23 and the cathode 21 is coupled to the other terminal of the impedance so that the potential drop developed across the impedance is applied as a bias between the control electrode 20 and cathode 21. This causes the bias on the control electrode 20 to increase at high values of power-supply line voltage and to decrease at low values of line voltage to a considerably greater extent than would be the case were the impedance 23 to be replaced by a linear resistor or like impedance. These two effects cause the average current and the peak anode pulse current and voltage of the amplifier tube 19 are to be relatively constant at both high and low values of power-supply line voltage, thus also causing the high voltage developed by the secondary winding 34 of the transformer 30 also to remain relatively constant in value with variations of line voltage. This also, of course, minimizes variations of current of the damper diode tube 32, so that it becomes possible to operate the scanning amplifier tube 19 near its full scan capabilities at low power-supply line voltage without subjecting it to operating positions which exceed its maximum ratings at high power-supply voltage. Greater reliability and trouble-free operation are thereby assured. All of the operating characteristics of the scanning amplifier and high-voltage supply are accordingly stabilized and the picture brightness and horizontal width remain substantially constant with variations of line voltage.

Table I following lists the percentage variations of certain specified operating currents and voltages with variations of power-supply line voltage where the "A" figures represent the percentage variations using a nonlinear impedance 23 in accordance with the invention while the "B" figures were obtained by substituting an ordinary resistor in place of the impedance 23 and selecting a value for this resistor such that the operating currents and voltages were identical to those obtained with the nonlinear impedance at a value of line voltage equal to 117 volts.

TABLE I

*Percentage variation of operating currents and voltages with respect to 117 volt line conditions—line voltage varied from 105 to 130 volts.*

| | Anode Current Tube 19 | Current of Tube 32 | Second Anode Voltage | Amplitude of Scan |
|---|---|---|---|---|
| | *Percent* | *Percent* | *Percent* | *Percent* |
| A | 10.7 | 9.5 | 15.7 | 6.6 |
| B | 28.6 | 25.9 | 27.5 | 15.8 |

The stabilizing effect of the nonlinear impedance 23 on the operating characteristics of the scanning amplifier and high-voltage supply system are at once apparent from the values of Table I.

From the foregoing description of the invention, it will be apparent that a scanning signal amplifier and high-voltage supply embodying the invention attain stability of their operating characteristics in a simple and inexpensive manner. In addition, the design of the amplifier and voltage supply is simplified and reduced in cost. Not only does the present invention insure greater reliability and trouble-free operation of an amplifier and voltage supply system, with consequent reduction of maintenance costs, but also avoids the very undesirable and highly disturbing reaction of one using a television receiver which is experienced with undesirable changes of picture brightness and picture size especially when the latter occurs in a rapid yet random manner with power-supply line voltage changes.

While there has been described what is at present considered to be the preferred embodiment of the invention, it will be apparent to those skilled in the art that various changes and modifications may be made therein without departing from the invention. Consequently, the appended claims should be interpreted broadly, as may be consistent with the spirit and scope of the invention.

What I claim is:

1. A stabilized scanning-signal amplifier and high-voltage supply comprising, an amplifier having an input circuit to which a signal of scanning wave form is applied and an output circuit, means for supplying power energization to said amplifier, means in said output circuit for developing a magnetic scanning field and during retrace intervals a relatively high voltage of pulse wave form, a rectifier system responsive to said voltage for deriving a high unidirectional voltage, and a nonlinear impedance included in said amplifier common to said input and output circuits thereof substantially to reduce variations of an operating characteristic of said amplifier with variations of energization thereof from said energizing means.

2. A stabilized scanning-signal amplifier and high-voltage supply comprising, an amplifier having an input circuit to which a signal of scanning wave form is applied and an output circuit, means for supplying power energization to said amplifier, means in said output circuit for developing a magnetic scanning field and during retrace intervals a relatively high voltage of pulse wave form, a rectifier system responsive to said voltage for deriving a high uni-directional voltage, and an impedance included in said amplifier common to said input and output circuits thereof and having a non-linear resistance characteristic for reducing variations of an operating characteristic of said amplifier with variations of energization thereof from said energizing means.

3. A stabilized scanning-signal amplifier and high-voltage supply comprising, an amplifier having an input circuit to which a signal of scanning wave form is applied and an output circuit, means for supplying power energization to said amplifier, means in said output circuit for developing a magnetic scanning field and during retrace intervals a relatively high voltage of pulse wave form, a rectifier system responsive to said voltage for deriving a high unidirectional voltage, and a tungsten wire conductor included in said amplifier common to said input and output circuits thereof substantially to reduce variations of an operating characteristic of said amplifier with variations of energization thereof from said energizing means.

4. A stabilized scanning-signal amplifier and high-voltage supply comprising, an amplifier having an input circuit to which a signal of scanning wave form is applied and an output circuit, means for supplying power energization to said amplifier, means in said output circuit for developing a magnetic scanning field and during retrace intervals a relatively high voltiage of pulse wave form, a rectifier system responsive to said voltage for deriving a high uni-directional voltage, and a nonlinear impedance included in said amplifier common to said input and output circuits thereof and having a nonlinear positive coefficient of resistance for substantially reducing variations of an operating characteristic of said amplifier with variations of energization thereof from said energizing means.

5. A stabilized scanning-signal amplifier and high-voltage supply comprising, a vacuum tube amplifier having input electrodes including a cathode to which a signal of scanning wave form is applied and having output electrodes including said cathode coupled to an output circuit, means for supplying power energization to said amplifier, means in said output circuit for developing a magnetic scanning field and during retrace intervals a relatively high voltage of pulse wave form, a rectifier system responsive to said voltage for deriving a high unidirectional voltage, and a nonlinear impedance included in the cathode circuit of said tube common to said input and output circuits thereof substantially to reduce variations of gain of said amplifier with variations of energization thereof from said energizing means.

References Cited in the file of this patent

UNITED STATES PATENTS

| | | |
|---|---|---|
| 2,566,432 | Sziklai | Sept. 4, 1951 |
| 2,628,326 | Bridges | Feb. 10, 1953 |
| 2,644,105 | Fyler | June 30, 1953 |
| 2,644,521 | Schlesinger | Dec. 29, 1953 |